United States Patent
Qiu

(10) Patent No.: US 11,398,722 B2
(45) Date of Patent: Jul. 26, 2022

(54) OVERCURRENT PROTECTION METHOD, DISPLAY PANEL AND DISPLAY DEVICE

(71) Applicant: HKC CORPORATION LIMITED, Guangdong (CN)

(72) Inventor: Bin Qiu, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 141 days.

(21) Appl. No.: 17/043,058

(22) PCT Filed: Dec. 24, 2018

(86) PCT No.: PCT/CN2018/123253
§ 371 (c)(1),
(2) Date: Sep. 29, 2020

(87) PCT Pub. No.: WO2020/118764
PCT Pub. Date: Jun. 18, 2020

(65) Prior Publication Data
US 2021/0021120 A1   Jan. 21, 2021

(30) Foreign Application Priority Data

Dec. 12, 2018 (CN) .......................... 201811514295.9

(51) Int. Cl.
*H02H 3/093* (2006.01)
*G09G 3/20* (2006.01)

(52) U.S. Cl.
CPC .......... *H02H 3/0935* (2013.01); *G09G 3/2092* (2013.01); *G09G 2310/0289* (2013.01); *G09G 2310/08* (2013.01)

(58) Field of Classification Search
None
See application file for complete search history.

(56) References Cited

U.S. PATENT DOCUMENTS

2012/0093276 A1   4/2012 Wang et al.
2014/0016240 A1*  1/2014 Kawata ............... H02H 3/0935
                                                361/95

FOREIGN PATENT DOCUMENTS

CN       101452049 A      6/2009
CN       101599630 A     12/2009
(Continued)

OTHER PUBLICATIONS

Chinese Office Action, dated Sep. 2, 2019, for HKC Corporation Limited, Chinese Application No. 201811514295.9, filed Dec. 12, 2018.
(Continued)

*Primary Examiner* — Christopher J Kohlman
(74) *Attorney, Agent, or Firm* — Law Offices of Albert Wai-Kit Chan, PLLC

(57) ABSTRACT

Disclosed are an overcurrent protection method, a display panel and a display device. The overcurrent protection method is applied to the display panel. The display panel includes a power supply circuit, a timing controller, a level shifting circuit and a gate driving circuit. The overcurrent protection method includes: in response to the level shifting circuit outputting a start clock signal to the gate driving circuit, timing, by the timing controller, and obtaining an input current average value input by the power supply circuit to the level shifting circuit during a first timing period t0 to t1; and controlling the gate driving circuit to enter an overcurrent protection state, in response to the input current average value being greater than or equal to a preset current average value.

18 Claims, 3 Drawing Sheets

(56) References Cited

FOREIGN PATENT DOCUMENTS

| CN | 103199506 A | 7/2013 |
|---|---|---|
| CN | 105448260 A | 3/2016 |
| CN | 105790206 A | 7/2016 |
| CN | 106409263 A | 2/2017 |
| CN | 107508252 A | 12/2017 |
| CN | 107742493 A | 2/2018 |
| CN | 108010497 A | 5/2018 |
| CN | 108154859 A | 6/2018 |
| CN | 108303581 A | 7/2018 |
| CN | 108550350 A | 9/2018 |
| WO | 2014069279 A1 | 5/2014 |

OTHER PUBLICATIONS

Chinese Office Action, dated May 22, 2020, for HKC Corporation Limited, Chinese Application No. 201811514295.9, filed Dec. 12, 2018.

International Search Report, dated Aug. 27, 2019, for HKC Corporation Limited, International Application No. PCT/CN2018/123253, filed Dec. 24, 2018.

Written Opinion of International Search Authority, dated Aug. 27, 2019, for HKC Corporation Limited, International Application No. PCT/CN2018/123253, filed Dec. 24, 2018.

\* cited by examiner

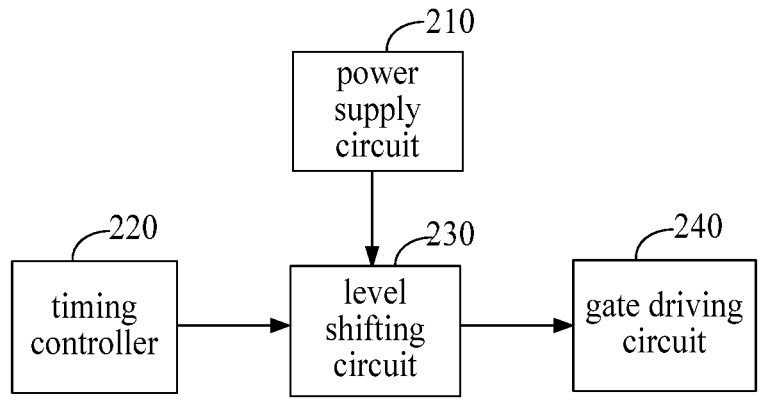

FIG. 1 in response to the level shifting circuit outputting a start clock signal to the gate driving circuit, timing, by the timing controller, and obtaining an input current average value input by the power supply circuit to the level shifting circuit during a first timing period t0 to t1 — S101 in response to the input current average value being larger than or equal to a preset current average value, controlling the gate driving circuit to be in an overcurrent protection state — S102

FIG. 2

OVERCURRENT PROTECTION METHOD, DISPLAY PANEL AND DISPLAY DEVICE

CROSS REFERENCE TO RELATED APPLICATIONS

The present disclosure is the National Stage of International Application No. PCT/CN2018/123253, filed Dec. 24, 2018, which claims the priority to Chinese Patent Application No. 201811514295.9, filed Dec. 12, 2018 with the China National Intellectual Property Administration and entitled "OVERCURRENT PROTECTION METHOD, DISPLAY PANEL, AND DISPLAY DEVICE", the entirety of which is hereby incorporated herein by reference.

TECHNICAL FIELD

The present disclosure relates to the field of display device, and more particularly relates to an overcurrent protection method, a display panel, and a display device.

BACKGROUND

The statement herein merely provides background information related to the present disclosure and does not necessarily constitute the existing technology.

At present, a gate driving circuit for a display panel is the gate row driving circuit that is made on an array substrate using a known TFT-LCD array process, where there to realize progressive scanning drive of pixels. However, the gate driving circuit drives the TFT-LCD array using a processed power signal, thus an overcurrent may occur in the gate driving circuit.

An overcurrent protection mechanism for the gate driving circuit in the display panel is to cut off the power supply of the gate driving circuit in case an instantaneous input current of the level shifter is detected to become large, thereby to realize the overcurrent protection. However, if the surging instantaneous input current is caused by external interference, an undesired overcurrent protection would be triggered, which causes a black screen.

SUMMARY

The present disclosure is to provide an overcurrent protection method, a display panel, and a display device, aiming to prevent undesired overcurrent protection for the gate driving circuit from being triggered.

In one aspect, the present disclosure provides an overcurrent protection method, which is applied to a display panel. The display panel includes a power supply circuit, a timing controller, a level shifting circuit, and a gate driving circuit. The overcurrent protection method includes:

in response to the level shifting circuit outputting a start clock signal to the gate driving circuit, timing, by the timing controller, and obtaining an input current average value input by the power supply circuit to the level shifting circuit during a first timing period t0 to t1; and in response to the input current average value being larger than or equal to a preset current average value, controlling the gate driving circuit to be in an overcurrent protection state.

In some embodiments, the operation of obtaining an input current average value input by the power supply circuit to the level shifting circuit during a first timing period t0 to t1 includes:

obtaining, by the timing controller, at least two of current values of the level shifting circuit input by the power supply circuit during the first timing period t0 to t1; and calculating an average value of the at least two of the current values, to obtain the input current average value.

In some embodiments, the operation of obtaining an input current average value input by the power supply circuit to the level shifting circuit during a first timing period t0 to t1 includes:

obtaining, by the timing controller, all of current values of the level shifting circuit input by the power supply circuit during the first timing period t0 to t1; and calculating an average value of the all of the current values, to obtain the input current average value.

In some embodiments, the preset current average value is an overcurrent protection value of the gate driving circuit.

In some embodiments, the method further includes:

obtaining input voltage values input by the power supply circuit to the level shifting circuit during a second timing period t2 to tn, in response to the input current average value being less than the preset current average value, wherein t2 is less than tn and greater than t1;

determining a quantity of input voltage values being greater than or equal to a preset voltage value among the obtained input voltage values; and controlling the gate driving circuit to be in the overcurrent protection state, in response to a determination that the quantity of the input voltage values being greater than or equal to the preset voltage value is greater than or equal to a preset quantity.

In some embodiments, the operation of obtaining input voltage values input by the power supply circuit to the level shifting circuit during a second timing period t2 to tn includes:

obtaining, by the timing controller, one of the input voltage values input by the power supply circuit to the level shifting circuit, in each period of the clock signal output by the level shifting circuit, during the second timing period t2 to tn.

In some embodiments, the operation of determining a quantity of input voltage values being greater than or equal to a preset voltage value among the obtained input voltage values includes:

determining a quantity of absolute values of input voltage values being greater than or equal to the preset voltage value among the obtained input voltage values; and the operation of controlling the gate driving circuit to be in the overcurrent protection state, in response to a determination that the quantity of the input voltage values being greater than or equal to the preset voltage value is greater than or equal to a preset quantity includes:

controlling the gate driving circuit to be in the overcurrent protection state, in response to a determination that the quantity of the absolute values of the input voltage values being greater than or equal to the preset voltage value exceeds the preset quantity.

In some embodiments, the operation of determining a quantity of absolute values of input voltage values being greater than or equal to the preset voltage value among the obtained input voltage values includes:

determining forward input voltage values in time of a positive level of a clock signal output by the level shifting circuit and reverse input voltage values in time of a negative level of the clock signal output by the level shifting circuit, calculating absolute values of the forward input voltage values and the reverse input voltage values, to obtain the absolute values of the voltage values; and comparing the absolute values of the voltage values with the preset voltage value, to obtain the quantity of the absolute values of the voltage values being greater than or equal to the preset voltage value.

In some embodiments, the controlling and leaving the gate driving circuit in an overcurrent protection state includes: cutting off power supply from the power supply circuit to the level shifting circuit.

In some embodiments, the first timing period t0 to t1 is a preset period of time.

In some embodiments, the first timing period t0 to t1 is less than or equal to a length of a first clock signal output by the level shifting circuit.

In some embodiments, t0 is a time point at which the level shifting circuit starts to output the start clock signal to the gate driving circuit.

In some embodiments, the preset current average value is an overcurrent protection value of the gate driving circuit.

In another aspect, the present disclosure also provides a display panel. The display panel includes a power supply circuit, a timing controller, a level shifting circuit, and a gate driving circuit. The timing controller includes a memory, a processor, an overcurrent protection program stored in the memory and executable by the processor. The overcurrent protection program when being executed by the processor performs the following steps of an overcurrent protection method:

in response to the level shifting circuit outputting a start clock signal to the gate driving circuit, timing, by the timing controller, and obtaining an input current average value input by the power supply circuit to the level shifting circuit during a first timing period t0 to t1; and in response to the input current average value is larger than or equal to a preset current average value, controlling the gate driving circuit to be in an overcurrent protection state.

In some embodiments, the timing controller is further configured for:

obtaining input voltage values input by the power supply circuit to the level shifting circuit during a second timing period t2 to tn, in response to the input current average value being less than the preset current average value, wherein t2 is less than tn and greater than t1;

determining a quantity of input voltage values being greater than or equal to a preset voltage value among the obtained input voltage values; and controlling the gate driving circuit to be in the overcurrent protection state, in response to a determination that the quantity of the input voltage values being greater than or equal to the preset voltage value is greater than or equal to a preset quantity.

In some embodiments, the timing controller is further configured for obtaining, by the timing controller, one of the input voltage values input by the power supply circuit to the level shifting circuit, in each period of the clock signal output by the level shifting circuit, during the second timing period t2 to tn.

In some embodiments, the timing controller is further configured for determining a quantity of absolute values of input voltage values being greater than or equal to the preset voltage value among the obtained input voltage values; and the operation of controlling the gate driving circuit to be in the overcurrent protection state, in response to a determination that the quantity of the input voltage values being greater than or equal to the preset voltage value is greater than or equal to a preset quantity includes: controlling the gate driving circuit to be in the overcurrent protection state, in response to a determination that the quantity of the absolute values of the input voltage values being greater than or equal to the preset voltage value exceeds the preset quantity.

In still another aspect, the present disclosure also provides a display device, including the display panel described above, which is not detailed herein.

In accordance with the present disclosure, the time point at which the level shifting circuit outputs the start clock signal to the gate driving circuit is timed by the timing controller in the display panel to record a first timing period t0 to t1. During the first timing period t0 to t1, the input current average value input by the power supply circuit to the level shifting circuit is obtained and compared with the preset current average value. If the input current average value to the level shifting circuit exceeds the overcurrent protection threshold of the circuit, it indicates that an excessive transient current may occur in the circuit, or a high level current may have lasted for a long time in the circuit, both of which do damage to the circuit. Thus, the overcurrent protection is needed for the gate driving circuit, so as to prevent the damage from occurring. If the input current average value to the level shifting circuit does not exceed the overcurrent protection threshold of the circuit, it indicates that the current in the circuit is occasionally fluctuating and will not last for a long time (the input current average value detected would be greater if the fluctuating lasts long), thus there is no need to trigger the overcurrent protection for the gate driving circuit. By calculating the input current average value to the level shifting circuit during the first timing period t0 to t1, whether overcurrent occurs in the gate driving circuit can be accurately determined, which prevents undesired triggering for overcurrent protection from occurring, thereby improving product stability.

BRIEF DESCRIPTION OF THE DRAWINGS

In order to illustrate the technical solution in the embodiments of the present disclosure or the prior art more clearly, brief description would be made below to the drawings required in the embodiments of the present disclosure or the prior art. Obviously, the drawings in the following description are merely some of the embodiments of the present disclosure, and those skilled in the art could obtain other drawings according to the structures shown in the drawings without any creative efforts.

FIG. 1 is a functional module diagram illustrating a circuit of a display panel according to an embodiment of the present disclosure.

FIG. 2 is a flowchart diagram illustrating an embodiment of an overcurrent protection method according to the present disclosure.

The realizing of the aim, functional characteristics and advantages of the present disclosure are further described in detail with reference to the accompanying drawings and the embodiments.

DETAILED DESCRIPTION OF THE EMBODIMENTS

The technical solutions in the embodiments of the present disclosure will be described clearly and completely combining the drawings in the embodiments of the present disclosure. Obviously, the described embodiments are only a part of the embodiments of the present disclosure, but not all of them. Based on the embodiments in the present disclosure, all other embodiments obtained by those skilled in the art without creative work shall belong to the protection scope of the present disclosure.

It should be understand that, all directional indications (such as "upper", "lower", "left", "right", "front", "back" . . . ) in the embodiments of the present disclosure are only used to explain the relative positional relationship, motion, and the like, between components in a certain posture. If the particular posture changes, the directional indication changes accordingly.

In addition, terms such as "first" and "second" are used herein for purposes of description and are not intended to indicate or imply relative importance or to imply the number of indicated technical features. Thus, the features defined with "first" and "second" may comprise or imply at least one of these features. In the description of the present disclosure, "a plurality of" means two or more than two, unless specified otherwise.

Figure 5:
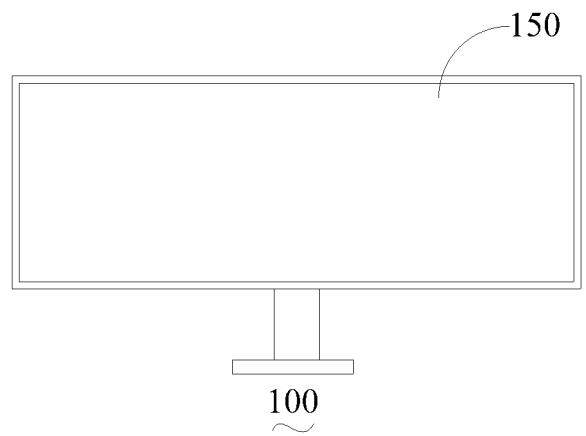
FIG. 5 is a structure diagram illustrating an embodiment of a display device according to the present disclosure.

The present disclosure provides a display device. Referring to FIG. 1 and FIG. 5, the display device 100 includes a display panel 150, and the display panel 150 includes a power supply circuit 210, a timing controller 220, a level shifting circuit 230, and a gate driving circuit 240. A power input end of the level shifting circuit 230 is connected with the power supply circuit 210, a control input end of the level shifting circuit 230 is connected with the timing controller 220, and an output end of the level shifting circuit 230 is connected with the gate driving circuit 240. The timing controller 220 outputs a control signal to control the level shifting circuit 230 to implement a level shifting on a power supply output by the power supply circuit 210, and then the level-shifted power supply is output to the gate driving circuit 240, so as to control the gate driving circuit 240 to drive a thin film transistor array to work. It should be noted that since the gate driving circuit 240 drives the thin film transistor array using the processed power supply signal, an overcurrent may occur in the gate driving circuit 240. In an known overcurrent protection mechanism, the power supply of the gate driving circuit 240 is cut off when an detected input current of the level converter is instantaneously increased, so as to realize the overcurrent protection. However, when the gate driving circuit 240 is just started, the input current of the level shifter is easily increased due to external interference (in this case, it is not a true overcurrent), thus an unwanted overcurrent protection mechanism may be triggered, which results in a black screen. To avoid this, another overcurrent protection mechanism is proposed, that is, the overcurrent detection is not performed until the gate driving circuit 240 has been started for a period of time, but in this case, the overcurrent protection cannot be provided during the period the gate driving circuit 240 started.

In view of the above, the present disclosure provides an overcurrent protection method. Referring to FIGS. 1 to 2, the overcurrent protection method includes:

Step S101, in response to the level shifting circuit outputting a start clock signal to the gate driving circuit, timing, by the timing controller, and obtaining an input current average value input by the power supply circuit to the level shifting circuit during a first timing period t0 to t1.

The input current average value is an average value of input currents of the level shifting circuit 230 during the first timing period t0 to t1. t0 refers to a start time point at which the level shifting circuit 230 starts to output the start clock signal to the gate driving circuit 240. If the timing is implemented at a time point after the start time point, there may exist a large instantaneous current during the time interval between this time point and the start time point, and an IC damage may occur, in this case, the gate driving circuit 240 cannot be truly protected. The first timing period t0 to t1 is a preset period of time, which corresponds to a period of time during the gate driving circuit 240 being started. Determined according to a first clock signal output by the level shifting circuit 230, a length of this period of time may be less than or equal to a length of a level time of the first clock signal. The gate driving circuit 240 completes its startup and enters a stable working state during this period of time, also the timing controller 220 obtains the input current average value during this period of time.

In this step, the timing controller 220 may be configured to obtain all or at least two of current values input by the power supply circuit 210 to the level shifting circuit 230 during the first timing period t0 to t1, so as to calculate the input current average value. The purpose of obtaining the input current average value input by the power supply circuit 210 to the level shifting circuit 230 during the first timing period t0 to t1 is to determine whether the gate driving circuit 240 is in a true risk of overcurrent. It should be noted that, in case where the current value of the level shifting circuit 230 does not exceed an overcurrent protection threshold of the circuit during the first timing period t0 to t1, it indicates that the current in the circuit is occasionally fluctuating and would not last for a long time (the input current average value detected would be greater if the fluctuation lasts long), thus, the circuit is not in the risk of overcurrent. In case where the current of the level shifting circuit 230 exceeds the overcurrent protection threshold of the circuit during the first timing period t0 to t1, it indicates that an excessive transient current may occur in the circuit, or there exists a high level current that has lasted for a long time in the circuit, both of which will damage the circuit. Thus, by calculating the input current average value to the level shifting circuit during the first timing period t0 to t1, whether overcurrent occurs in the gate driving circuit can be accurately determined, which prevents undesired triggering for overcurrent protection from occurring, thereby improving the stability.

Step S102, in response to the input current average value being larger than or equal to a preset current average value, controlling the gate driving circuit to be in an overcurrent protection state.

In this embodiment, the preset current average value may be an upper limit value of a normally fluctuating current when the gate driving circuit 240 operates normally. In an embodiment, the preset current average value may be an overcurrent protection value of the gate driving circuit 240, namely a maximum current value that the gate driving circuit 240 can withstand. It will be appreciated that the preset current average value may also be a little smaller than the maximum current value that the gate driving circuit 240 can withstand. If the timing controller 220 determines that the input current average value to the level shifting circuit 230 exceeds the overcurrent protection threshold during the first timing period t0 to t1, it indicates that an excessive transient current may occur in the circuit, or a high current may have lasted for a long time in the circuit, both of which do damage to the circuit. In this case, the gate driving circuit 240 needs to be protected.

In this embodiment, by cutting off the power supply from the power supply circuit 210 to the level shifting circuit 230, the gate driving circuit 240 is controlled to enter the overcurrent protection state. It will be appreciated that some other manners may also be adopted for the overcurrent protection of the gate driving circuit 240, such as directly turning off the power supply.

It will be appreciated that, in response to the level shifting circuit 230 outputting the start clock signal to the gate driving circuit 240, the timing controller in the display panel starts the timing, and obtains the input current average value input by the power supply circuit to the level shifting circuit during the first timing period t0 to t1. The input current average value is compared with the preset current average value. In case where the input current average value to the level shifting circuit 230 during the first timing period t0 to t1 exceeds the overcurrent protection threshold of the circuit, it indicates that an excessive transient current may occur in the circuit, or a high current may have lasted for a long time in the circuit, both of which do damage to the circuit. Thus, the overcurrent protection for the gate driving circuit 240 is needed to prevent the damage. In case where the input current average value to the level shifting circuit 230 does not exceed the overcurrent protection threshold of the circuit, it indicates that the current in the circuit is occasionally fluctuating and will not last for a long time (the input current average value detected would be greater if the fluctuating lasts long), thus there is no need to trigger the overcurrent protection for the gate driving circuit 240. By calculating the input current average value to the level shifting circuit 230 during the first timing period t0 to t1, whether overcurrent occurs in the gate driving circuit 240 can be accurately determined, which prevents undesired triggering for overcurrent protection from occurring, thereby improving the product stability.

In an embodiment, to reduce the calculation amount and improve the overcurrent protection efficiency, the step of obtaining the input current average value input by the power supply circuit to the level shifting circuit during the first timing period t0 to t1 includes:

obtaining, by the timing controller, at least two of current values input by the power supply circuit to the level shifting circuit during the first timing period t0 to t1; and calculating an average value of the at least two of the current values, to obtain the input current average value.

In this embodiment, during the first timing period t0 to t1, the process of the power supply circuit 210 outputting the current to the level shifting circuit 230 is continuous and unstable. In order to obtain the input current average value, first, the timing controller 220 obtains at least two of current value samples during this period of time, for example, two current value samples, five current value samples, or ten current value samples, etc.; then, the timing controller 220 calculates an average value of the obtained current value samples, so as to obtain the input current average value during the first timing period t0 to t1. Since the occurrence of a large current in the circuit of the display panel 150 during the startup process would damage the IC, by detecting the average value during the first timing period t0 to t1, the circuit in the display panel 150 is effectively protected, and also the detection accuracy is improved, thereby preventing undesired overcurrent protection from being activated. It should be noted that the accuracy is improved with the increasing number of the current values used for calculating the average value. However, the calculation amount is reduced with the decreasing number of the current values used for calculating the average value, and accordingly the response to the overcurrent condition is quicker, thus improving the efficiency of overcurrent protection.

Figure 3:
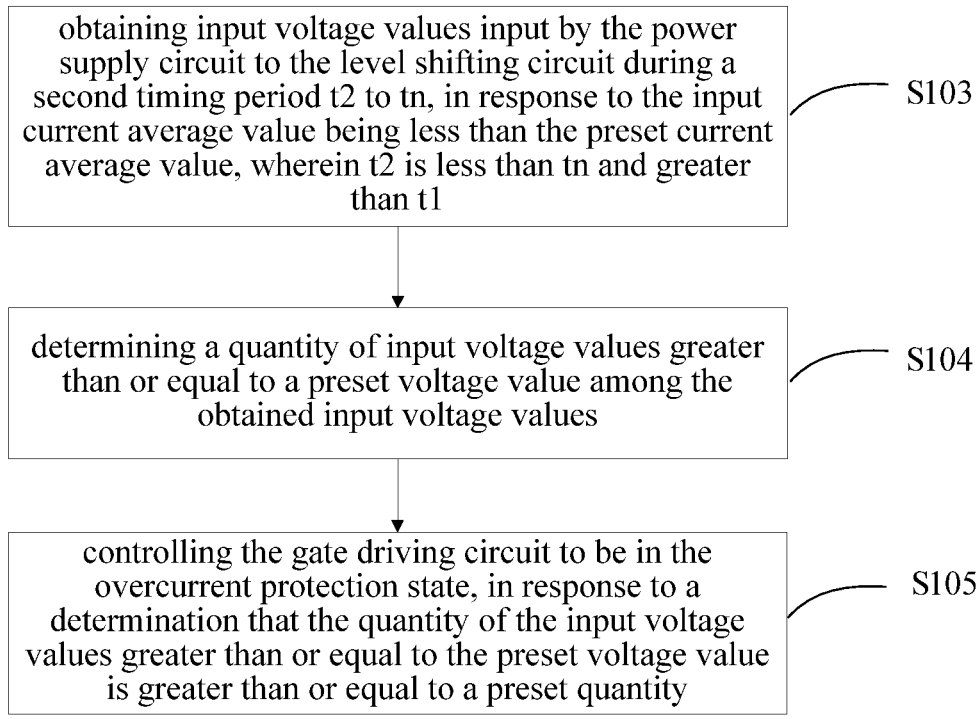
FIG. 3 is a flowchart diagram illustrating another embodiment of an overcurrent protection method according to the present disclosure.

In an embodiment, to further improve the overcurrent protection effect, referring to FIG. 3, the overcurrent protection method further includes:

Step S103, obtaining input voltage values input by the power supply circuit to the level shifting circuit during a second timing period t2 to tn, in response to the input current average value being less than the preset current average value, wherein t2 is less than tn and greater than t1.

Step S104, determining a quantity of input voltage values being greater than or equal to a preset voltage value among the obtained input voltage values.

Step S105, controlling the gate driving circuit to be in the overcurrent protection state, in response to a determination that the quantity of the input voltage values being greater than or equal to the preset voltage value is greater than or equal to a preset quantity.

In this embodiment, the preset voltage value and the preset quantity are preset in the timing controller 220, which are used as reference for determining.

Figure 4:
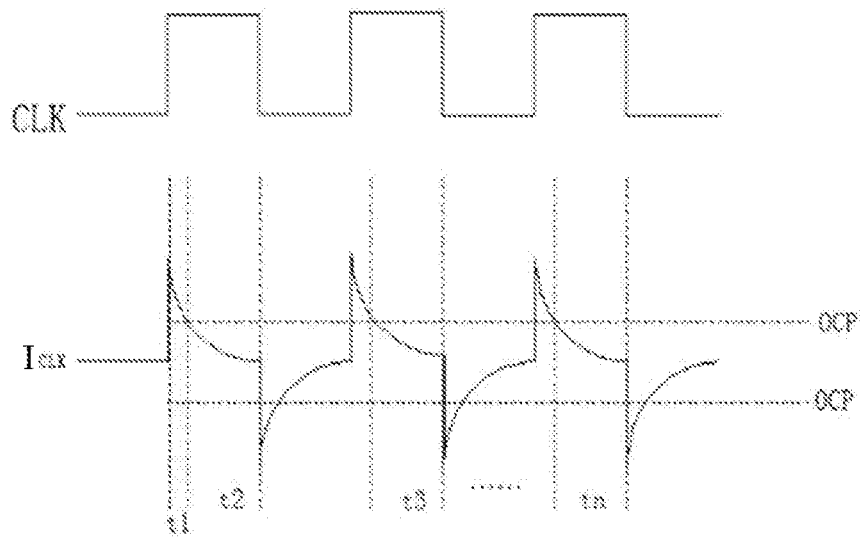
FIG. 4 is a diagram illustrating a waveform relationship between a clock signal output by a level shifting circuit and a current according to the present disclosure.

When the input current average value is less than the preset current average value, it is determined that no overcurrent occurs during the first timing period t0 to t1, and the monitoring is continued. An accumulated number is incremented by one whenever the voltage value of the level shifting circuit 230 input by the power supply circuit 210 is detected to be larger than or equal to the preset voltage value. When the accumulated number is larger than or equal to the preset number of times, it indicates that overcurrent may occur in the gate driving circuit 240, and accordingly the gate driving circuit 240 is controlled to enter the overcurrent protection state. When the accumulated number is less than the preset number of times, the gate driving circuit 240 in the display panel 150 continues working as normal. Referring to FIG. 4, the voltage value input by the power supply circuit 210 to the level shifting circuit 230 may be acquired once or more than once in each period of the clock signal output from the level shifting circuit 230. It can be understood that, during the second timing period t2 to tn, the timing controller 220 acquires only the voltage value in each period of the clock signal output by the level shifting circuit 230, in order to improve the calculation efficiency. The voltage value of each period can reflect the overall condition of this cycle, thereby ensuring high accuracy. A large number of values obtained for calculation will increase the calculation cost. The clock signal of the level shifting circuit 230 is recorded as CLK, the current value in the clock signal of the level shifting circuit 230 is recorded as $I_{CLK}$, and the preset overcurrent protection threshold in the clock signal of the level shifting circuit 230 is recorded as OCP.

In this embodiment, the operation of obtaining the voltage values input by the power supply circuit 210 to the level shifting circuit 230 during the second timing period t2 to tn is performed after the first timing period t0 to t1. If the operation in the first timing period t0 to t1 is not performed, no subsequent operation takes place the circuit of the display panel 150. On the time axis, tn>t2>t1>t0. The second timing period t2 to tn may be set as a frame time, which is convenient for controlling the overcurrent protection.

In this embodiment, there may exist high level current due to component loss when the circuit is in operation. By obtaining the quantity of the voltage values being greater than or equal to the preset voltage value during the second timing period t2 to tn, and determining whether the quantity is larger than or equal to the preset quantity, the overcurrent protection for the gate driving circuit 240 can be performed during the second timing period t2 to tn.

In this embodiment, the operation of determining the quantity of the voltage values being greater than or equal to the preset voltage value may be performed by: determining forward input voltage values in time of a positive level of a clock signal output by the level shifting circuit 230 and reverse input voltage values in time of a negative level of the clock signal output by the level shifting circuit 230, calculating absolute values of the forward input voltage values and the reverse input voltage values, to obtain the absolute values of the voltage values; and comparing the absolute values of the voltage values with the preset voltage value, to obtain the quantity of the absolute values of the voltage values being greater than or equal to the preset voltage value.

In this embodiment, the operation of determining the quantity of the voltage values being greater than or equal to the preset voltage value may be performed by: determining a quantity of absolute values of voltage values being greater than or equal to the preset voltage value. In each period of the clock signal output by the level shifting circuit 230, there is a switching between a positive level and a negative level, and during which the input voltage value may be greater than or equal to the preset voltage value. In this case, first, the forward input voltage value in the positive level time of the clock signal output by the level shifting circuit 230 and the reverse input voltage value in the negative level time of the clock signal output by the level shifting circuit 230 may be determined, the absolute value operation is performed on the forward input voltage value and the reverse input voltage value, to obtain an absolute value of the input voltage value; and then the absolute value of the input voltage value is compared with the preset voltage value, to obtain the quantity of absolute values of the input voltage values being greater than or equal to the preset voltage value. As such, the operation is simplified and the efficiency is improved.

In this embodiment, by performing the absolute value calculation on the voltage values to the level shifting circuit 230, so as to allow the timing controller 220 to count the quantity of the voltage values being greater than or equal to the preset voltage value during the second timing period t2 to tn, the reverse input voltage value in the negative level time of the clock signal output by the level shifting circuit 230 that is larger than or equal to the preset voltage value can also be detected, so as to provide more effective overcurrent protection for the gate driving circuit 240 during the second timing period t2 to tn.

In the above embodiments, the display panel 150 includes, but is not limited to, a Liquid Crystal Display panel, an Organic Light Emitting Diode Display panel, a Field Emission Display panel, a Plasma Display panel, and a Curved Surface panel. The Liquid Crystal Display panel includes a Thin Film Transistor Liquid Crystal Display panel, a Twisted Nematic (TN) panel, a Vertical Alignment (VA) panel, an In-Plane Switching (IPS) panel, etc.

Figure 6:
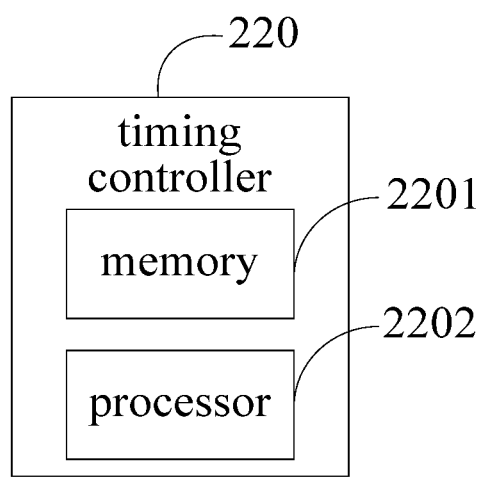
FIG. 6 is a functional module diagram illustrating a timing controller according to an embodiment of the present disclosure.

It should be noted that, referring to FIG. 6, the timing controller 220 includes a memory 2201, a processor 2202, and an overcurrent protection program stored in the memory 2201 and executable by the processor 2202. The overcurrent protection program when being executed by the processor 2202 performs the steps in the above overcurrent protection method. It can be understood that since the overcurrent protection method is adopted in the display panel 150, the display panel 150 includes all the technical solutions of all the embodiments of the overcurrent protection method described above, and can also achieve identical technical effects, which is not detailed herein.

In addition, the display device 100 includes the above-described display panel 150, where the display panel 150 is applied with the above-described overcurrent protection method. Therefore, the display device 100 incorporates the technical solutions of all the embodiments of the overcurrent protection method described above, and can also achieve identical technical effects. It should be noted that the display device 100 may be a normal display, or a flat panel television, or the like, and may also be a liquid crystal display or a liquid crystal television.

The foregoing are only illustrative embodiments in accordance with the present disclosure and therefore not intended to limit the patentable scope of the present disclosure. Any equivalent structure or flow transformations that are made taking advantage of the specification and accompanying drawings of the disclosure and any direct or indirect applications thereof in other related technical fields are within the protection scope of the present disclosure.

What is claimed is:

1. An overcurrent protection method, applied to a display panel, the display panel comprising a power supply circuit, a timing controller, a level shifting circuit, and a gate driving circuit;

wherein the overcurrent protection method comprises:
in response to the level shifting circuit outputting a start clock signal to the gate driving circuit, timing, by the timing controller, and obtaining an input current average value input by the power supply circuit to the level shifting circuit during a first timing period t0 to t1; and
in response to the input current average value being larger than or equal to a preset current average value, controlling the gate driving circuit to be in an overcurrent protection state.

2. The overcurrent protection method of claim 1, wherein the operation of obtaining an input current average value input by the power supply circuit to the level shifting circuit during a first timing period t0 to t1 comprises:
obtaining, by the timing controller, at least two of current values input by the power supply circuit to the level shifting circuit during the first timing period t0 to t1; and
calculating an average value of the at least two of the current values, to obtain the input current average value.

3. The overcurrent protection method of claim 1, wherein the operation of obtaining an input current average value input by the power supply circuit to the level shifting circuit during a first timing period t0 to t1 comprises:
obtaining, by the timing controller, all of current values input by the power supply circuit to the level shifting circuit during the first timing period t0 to t1; and
calculating an average value of the all of the current values, to obtain the input current average value.

4. The overcurrent protection method of claim 1, wherein the preset current average value is an overcurrent protection value of the gate driving circuit.

5. The overcurrent protection method of claim 1, further comprising:
obtaining input voltage values input by the power supply circuit to the level shifting circuit during a second timing period t2 to tn, in response to the input current average value being less than the preset current average value, wherein t2 is less than tn and greater than t1;

determining a quantity of input voltage values being greater than or equal to a preset voltage value among the obtained input voltage values; and controlling the gate driving circuit to be in the overcurrent protection state, in response to a determination that the quantity of the input voltage values being greater than or equal to the preset voltage value is greater than or equal to a preset quantity.

6. The overcurrent protection method of claim 5, wherein the operation of obtaining input voltage values input by the power supply circuit to the level shifting circuit during a second timing period t2 to tn comprises:

obtaining, by the timing controller, one of the input voltage values input by the power supply circuit to the level shifting circuit, in each period of the clock signal output by the level shifting circuit, during the second timing period t2 to tn.

7. The overcurrent protection method of claim 5, wherein, the operation of determining a quantity of input voltage values being greater than or equal to a preset voltage value among the obtained input voltage values comprises:

determining a quantity of absolute values of the input voltage values being greater than or equal to the preset voltage value among the obtained input voltage values; and the operation of controlling the gate driving circuit to be in the overcurrent protection state, in response to a determination that the quantity of the input voltage values being greater than or equal to the preset voltage value is greater than or equal to a preset quantity comprises:

controlling the gate driving circuit to be in the overcurrent protection state, in response to a determination that the quantity of the absolute values of the input voltage values being greater than or equal to the preset voltage value exceeds the preset quantity.

8. The overcurrent protection method of claim 7, wherein the operation of determining a quantity of absolute values of input voltage values being greater than or equal to the preset voltage value among the obtained input voltage values comprises:

determining forward input voltage values in time of a positive level of a clock signal output by the level shifting circuit and reverse input voltage values in time of a negative level of the clock signal output by the level shifting circuit, calculating absolute values of the forward input voltage values and the reverse input voltage values, to obtain the absolute values of the voltage values; and comparing the absolute values of the voltage values with the preset voltage value, to obtain the quantity of the absolute values of the voltage values being greater than or equal to the preset voltage value.

9. The overcurrent protection method of claim 1, wherein the operation of controlling the gate driving circuit to be in an overcurrent protection state comprises:

cutting off power supply from the power supply circuit to the level shifting circuit.

10. The overcurrent protection method of claim 9, wherein the first timing period t0 to t1 is less than or equal to a level time of a first clock signal output by the level shifting circuit.

11. The overcurrent protection method of claim 1, wherein the first timing period t0 to t1 is a preset period of time.

12. The overcurrent protection method of claim 1, wherein t0 is a time point at which the level shifting circuit starts to output the start clock signal to the gate driving circuit.

13. The overcurrent protection method of claim 1, wherein the preset current average value is an overcurrent protection value of the gate driving circuit.

14. A display panel, comprising a power supply circuit, a timing controller, a level shifting circuit, and a gate driving circuit; wherein the timing controller comprises a memory, a processor, and an overcurrent protection program stored in the memory and executable by the processor, the overcurrent protection program when being executed by the processor performs the following steps of an overcurrent protection method:

in response to the level shifting circuit outputting a start clock signal to the gate driving circuit, timing, by the timing controller, and obtaining an input current average value input by the power supply circuit to the level shifting circuit during a first timing period t0 to t1; and in response to the input current average value being larger than or equal to a preset current average value, controlling the gate driving circuit to be in an overcurrent protection state.

15. The display panel of claim 14, wherein the timing controller is further configured for:

obtaining input voltage values input by the power supply circuit to the level shifting circuit during a second timing period t2 to tn, in response to the input current average value being less than the preset current average value, wherein t2 is less than tn and greater than t1;

determining a quantity of input voltage values being greater than or equal to a preset voltage value among the obtained input voltage values; and controlling the gate driving circuit to be in the overcurrent protection state, in response to a determination that the quantity of the input voltage values being greater than or equal to the preset voltage value is greater than or equal to a preset quantity.

16. The display panel of claim 15, wherein the timing controller is further configured for:

obtaining, by the timing controller, one of the input voltage values input by the power supply circuit to the level shifting circuit, in each period of the clock signal output by the level shifting circuit, during the second timing period t2 to tn.

17. The display panel of claim 15, wherein the timing controller is further configured for:

determining a quantity of absolute values of input voltage values being greater than or equal to the preset voltage value among the obtained input voltage values; and the controlling the gate driving circuit to be in the overcurrent protection state, in response to a determination that the quantity of the input voltage values being greater than or equal to the preset voltage value is greater than or equal to a preset quantity comprises:

controlling the gate driving circuit to be in the overcurrent protection state, in response to a determination that the quantity of the absolute values of the input voltage values being greater than or equal to the preset voltage value exceeds the preset quantity.

18. A display device, comprising a display panel;

wherein the display panel comprises a power supply circuit, a timing controller, a level shifting circuit, and a gate driving circuit, the timing controller comprises a memory, a processor, and an overcurrent protection program stored in the memory and executable by the processor, the overcurrent protection program when being executed by the processor performs the following steps of an overcurrent protection method:

in response to the level shifting circuit outputting a start clock signal to the gate driving circuit, timing, by the timing controller, and obtaining an input current average value input by the power supply circuit to the level shifting circuit during a first timing period t0 to t1; and in response to the input current average value being larger than or equal to a preset current average value, controlling the gate driving circuit to be in an overcurrent protection state.

* * * * *